W. H. McMURTRY.
FILTER.
APPLICATION FILED FEB. 10, 1912.
1,035,890.
Patented Aug. 20, 1912.
2 SHEETS—SHEET 1.
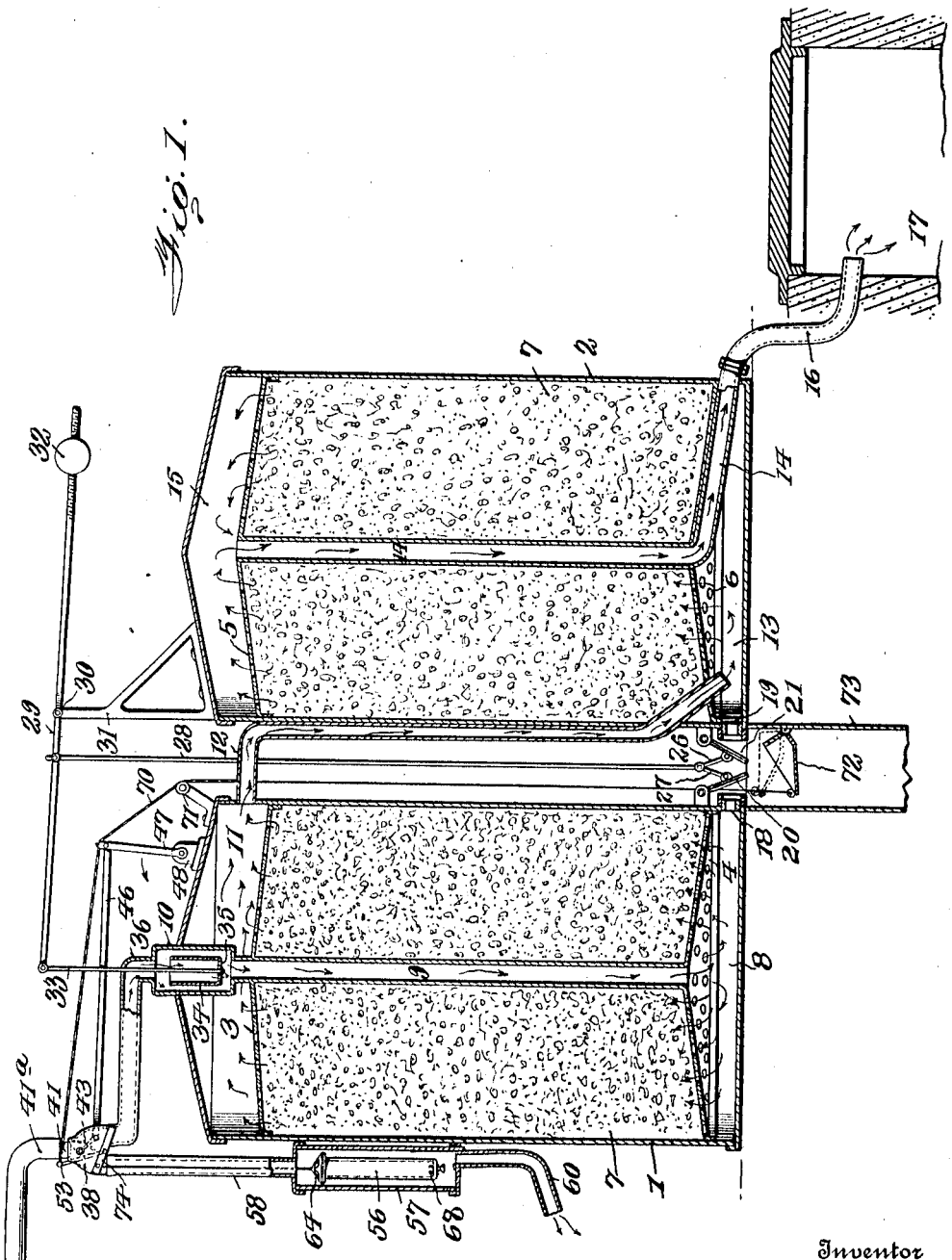
Witnesses
Inventor
W. H. McMurtry
By John H. Hoch
his Attorney W. H. McMURTRY.
FILTER.
APPLICATION FILED FEB. 10, 1912.
1,035,890.
Patented Aug. 20, 1912.
2 SHEETS—SHEET 2.
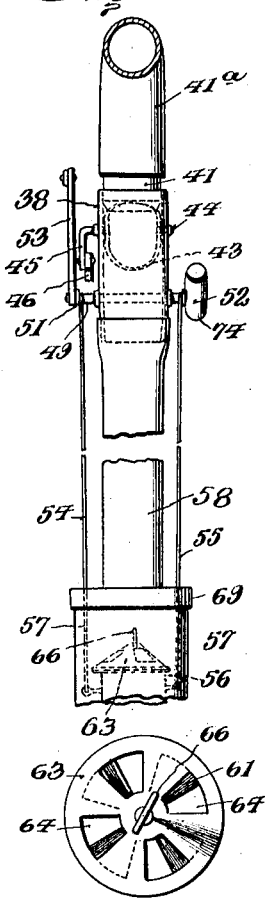
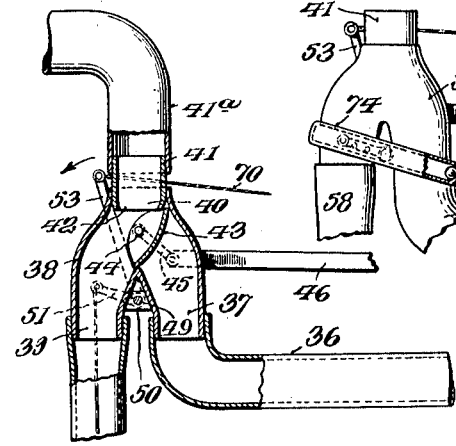
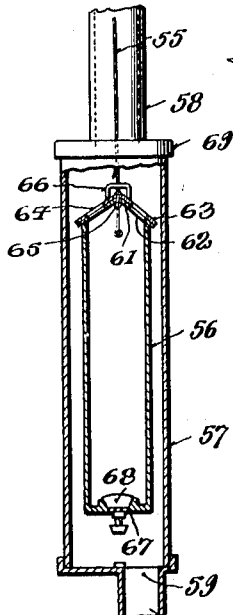
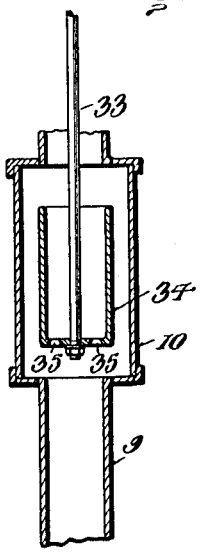
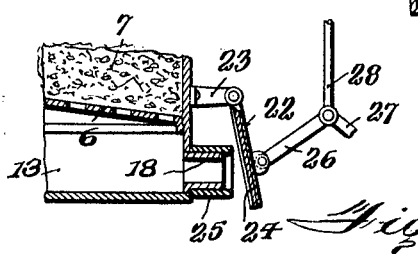
Witnesses
Helge H. Murray
R. M. Bowman
Inventor
W. H. McMurtry
By John H. Holt
his Attorney
COLUMBIA PLANOGRAPH CO., WASHINGTON, D. C.

UNITED STATES PATENT OFFICE.

WILLIE H. McMURTRY, OF ELIZABETHTOWN, KENTUCKY.

FILTER.

1,035,890.  Specification of Letters Patent.  Patented Aug. 20, 1912.

Application filed February 10, 1912. Serial No. 676,749.

*To all whom it may concern:*

Be it known that I, WILLIE H. McMURTRY, a citizen of the United States, residing at Elizabethtown, in the county of Hardin and State of Kentucky, have invented certain new and useful Improvements in Filters, of which the following is a specification.

This invention relates more especially to improvements in that class of filters designed for filtering rain water after it has fallen on the roof of a house or other structure and passed through the down spout from the gutter, the primary object of the invention being to prevent the passage into the filter proper of water containing filthy or impure washings from said roofs.

With the above object in view, my said invention embodies the novel construction and arrangement of parts hereinafter described and more particularly pointed out in the accompanying claims.

In order to more fully describe my said invention, reference will be had to the accompanying drawings, wherein;

Figure 1 represents a vertical central section of a filter embodying one specific form of my invention; Fig. 2, a detail vertical sectional elevation of the cut-off mechanism for controlling the starting of the filter after the rain has been falling for a given time; Fig. 3, a fragmentary side elevation of said parts; Fig. 4, a fragmentary front elevation of said parts; Fig. 5, a detail top plan view of one of the counterbalance buckets; Fig. 6, a detail fragmentary central vertical section of the counterbalance cup and its related parts, and Fig. 7 is a fragmentary detail section showing the construction of one of the flushing outlets and its valve.

Referring to the accompanying drawings, 1 and 2 represent two filter tanks of any desired shape, provided respectively with perforated false tops and bottoms 3—4 and 5—6 between which is carried charcoal or other suitable filtering material 7, as shown. Opening into the space 8 in the bottom of tank 1 and extending vertically through the false top 3, is a pipe 9, the upper end of which opens into a casing 10 of larger diameter than said pipe. Opening into the space 11 through one side of the tank 1 is an outlet pipe 12 which passes downward and opens at its lower end into the space 13 in the bottom of tank 2 beneath its false bottom. A pipe 14 opens into the space 15 in the tank 2 above its false top, passes down through the false bottom 6 of that tank, then outward through one side of the tank. This is the main outlet for the filtered water and may be any suitable pipe connection 16 leading to a cistern 17 or other reservoir.

In addition to the main outlet 14, each tank is provided with a flushing outlet at or near its bottom, consisting in the case shown, of two short tubes 18 and 19 opening into the spaces 8 and 13 respectively. These flushing outlets are controlled respectively by two clapper valves 20 and 21, consisting (see Fig. 7) each of a plate 22 hinged to a suitable support 23, and provided with a leather facing 24. The tubes 18 and 19 are each provided with a rubber sleeve 25, which extends a short distance beyond the front of the tubes for engagement by the leather face of the valve gates. This arrangement constitutes an extremely simple and efficient valve—one which will not leak and which is readily accessible. The clap valves 20 and 21 are operated by toggle levers 26 and 27, connected to a common lever arm 28, which in turn is pivotally secured to a lever 29, fulcrumed as at 30 in any suitable support 31. One of the arms of lever 29 carries an adjustable counterbalance weight 32 while to the other arm is pivotally connected a rod 33 which extends into the casing 10 where it is rigidly secured to the bottom of a cup 34, in the bottom of which are provided small openings 35. Opening into the upper end of the casing 10 is an inlet duct or pipe 36, which leads from an outlet passage 37 (see Fig. 2) of a by-pass or valve casing 38. This valve casing is provided with a second outlet passage 39 and an inlet passage 40 common to both said outlets. This inlet passage is through a sleeve 41 inserted in the upper end of the valve casing and slightly contracted at its lower end, where it forms a flange 42.

Mounted in the valve casing 38 is a swinging valve 43 pivotally mounted by means of trunnions 44 in the side walls of the valve casing and so shaped that in either of its operating positions, its upper edge will pass up behind the flange extensions 42 of the sleeve 41 and securely shut off one of the outlet passages 37, 39 from the inlet passage 40, while opening the other of said passages to said inlet.

Secured fast to one of the trunnions 44 of valve 43 outside the valve casing is a lever arm 45, pivotally connected at one end to a connecting rod 46 which, at its other end is pivotally connected to the upper end of a lever arm 47, pivoted in any suitable support 48.

Extending transversely to the valve casing 38 and exterior thereto is a shaft or rod 49 (see Figs. 2 and 3) mounted for rotation in suitable supports 50. Made fast to the ends of this shaft, are two arms 51 and 52, respectively, and to one end of shaft 49 is also made fast a second arm 53. The arms 51 and 53 may be considered as two arms of a bell crank lever. The outer ends of the arms 51 and 52 are connected respectively to two rods, wires or other suitable connecting means 54 and 55, to an elongated bucket 56, located in a chamber formed by a casing 57. This chamber is in communication through a duct 58 with the outlet passage or by-pass 39. The lower end of the casing 57 is provided with an outlet opening 59 which is provided in turn with any suitable spout or outlet duct 60. The top of the bucket 56 is preferably cone-shaped and consists of a fixed member 61, having a series of openings 62 therein, and a movable cap or shutter 63, having a corresponding number of openings 64 and pivotally secured as at 65 to the fixed member 61. The shutter 63 is provided with a handle 66 for turning it on its pivot so as to vary the size of the openings through the bucket top. The bottom of the bucket 56 is provided with an outlet opening 67, controlled by a plunger valve 68, having a stem adapted to engage the bottom of the casing 57 to operate the valve, as later described. The casing 57 is provided with a removable cover 69 which affords ready access to the bucket 56, in order to adjust its shutter top, as hereinafter more fully described.

Connected to the upper end of lever 53 is a flexible wire or rope 70, made fast to the upper end of lever 47 and passing over a pulley 71 down to a pivoted pan 72, to which it connects as shown. This pan 72 is located in a waste pipe or duct 73 and beneath the filter flushing outlets 18 and 19, so that when the pan is in the raised dotted line position shown, it will be in position to receive water from said outlets.

Made fast in any desired way to lever arm 52, is a tube 74 closed at each end and containing a movable counterbalance ball 75, which may roll from one end of the tube to the other, depending which end of the tube is elevated. This tube preferably extends an equal distance on either side of the axis of arm 52. The inlet tube 41 of the valve casing 38 opens into a pipe 41ª which leads from the gutter down spout or other source of rain water.

The operation of the filter is as follows: The normal position of the moving parts of the filter when not operating are shown in Fig. 1; the valves 20 and 21 open, the pan 72 down, the cup 34 up, the bucket 56 up, and the valve 43 in position to close the communication between inlet 40 and the outlet 37 to the filter and open communication from inlet 40 through the by-pass outlet 39. The counter balance tube 74 is tilted so that its ball 75 overcomes the weight of the empty bucket 56 and keeps it in its up position. With the parts in these positions, we will now assume that it commences to rain. The rain water will then pass through delivery pipe 41ª, inlet 40 and by-pass 39 into the chamber of casing 57, where it will fall upon the top of bucket 56. A portion of this water will enter the openings through the top of bucket 56 and when enough water has entered, the bucket 56 to overcome the counter balance weight 75 and the weight of pan 72, the bucket 56 will descend. In descending, the bucket 56 pulls down on connections 54 and 55, thereby rotating shaft 49 and operating lever arm 53 in the direction of the arrow, Fig. 2. This lever arm then acting through connection 70, operates lever 47 in the direction of the arrow, Fig. 1, and raises pan 72 to the dotted line position shown. The lever 47 thus operated acts through connecting rod 46 and arm 45 to shift the valve 43 from the position shown in Fig. 2, to a position diametrically opposite when it closes the by-pass outlet 39 and opens communication from the inlet 42 to the main outlet 37, thereby diverting the rain water into supply pipe 37 and thence into the chamber formed by the casing 10, when it falls into the open cup 34. When a sufficient quantity of water has fallen into the cup 34 to overbalance weight 32, the cup descends, sending rod 28 down and closing the clapper valves 20 and 21. As it continues to rain, water continues to flow into the chamber of casing 10, thence down through duct 9 into space 8, thence through the filtering material 7, to the space 11, out through duct 12, to the bottom space 13 of tank 2, thence up through the filtering material 7 of that tank to space 15, and thence out through ducts 14—16 to the cistern 17 or other place of reception or storage. The holes 35 in the bottom of cup 34 are of such a size as to prevent the water from flowing out of the cup faster than it flows in until after the rain ceases so that the cup 34 when once sent down will remain down as long as required. When the bucket 56 descends, the stem of its valve strikes the bottom of casing 57, thereby opening the outlet 67 and allowing the bucket to empty itself. This bucket, however, will not yet rise, notwithstanding all the water has passed out of it, owing to the action of the counterbalancing device 74—75 described. When the rain ceases, the water in cup 34 flows out of that cup through openings 35, thereby emptying the cup. The loss of the weight of this water in the cup causes counterbalance weight 32 to descend, raising the rod 28 and opening the valves 20 and 21. Water then flows from outlets 18 and 19 into pan 72 which, when a sufficient amount of water has fallen thereinto to overbalance the weight 75 and bucket 56, the pan will drop on its hinged support to the full line position shown in Fig. 1, emptying itself and thereby placing itself in proper condition to be again raised. When the pan 72 drops, as described, it pulls down on the connection 70, thereby operating lever 53 to raise the bucket 56 to its normal or up position, and also operating through the arm 45 to shift the valve 43 to the full line position shown in Fig. 2, when all the parts will be restored to normal, ready for another series of operations as just described when it rains again.

The valved or shutter top on the bucket 56 provides a simple and efficient means for regulating the flow of water thereinto and thereby regulating the time for a given rain fall that it must rain before enough water will pass into the bucket to start water into the filter.

From the foregoing description, it will be seen that my improved arrangement provides very effectually against the filtering of unclean water containing the washings of roofs, which it is common practice to permit to pass into filters and in effecting this, I provide a mechanism which is purely automatic both as to its starting and restoration to normal. When once set up, the device may therefore be left alone to work itself. It should be especially noted that the water which operates to start the filter into action, which is the water containing roof washings, does not pass to the filter proper and never gets into the filtering material. This is effected by arranging the bucket 56 so as to receive water from the by-pass and so located that when the water which operates the bucket flows out of it, it flows to waste and not to the filter proper. In this way, the chances of filtering water containing roof washings is reduced to a minimum. Moreover, the parts are of such simple construction as to require a minimum amount of attention. The location and construction of the valves 20 and 21 also add to the general efficiency of the filter. Being on the outside of the filter tanks, they are easy of access, and their cushion seats render them sure in action. In this class of devices, the water passing from outlets 18 and 19 often carry bodies, such as sand and small gravel and it is important to provide a valve which will not be prevented from closing by any such bodies. The valves herein shown are particularly effective in such cases.

The valve 43 and its associated parts may occupy any desired position relative to the filter tanks, and may be supported in any suitable manner. It should also be understood that my invention is not limited to any specific number of filter tanks; I may employ only one if desired.

Various other modifications may be made in my invention as herein shown, without departing from the true spirit thereof.

What I claim is:

1. The combination with a filter tank, of a duct to convey water to said tank, a by-pass leading from said duct to convey water away from said tank, a valve for controlling the passage of water through said by-pass and duct, and means operated by the water flowing through said by-pass to automatically operate said valve to close said by-pass and thereby divert the water to the filter tank.

2. The combination with a filter tank having a valve controlled water outlet, a supply duct to convey water to said filter, automatic means operated by the water flowing to said filter to operate said valve, a by-pass leading from said supply duct, a valve controlling said by-pass, and means automatically operated by the water flowing from said valve controlled outlet to operate said by-pass valve to open said by-pass and close the passage of said supply duct to the filter tank.

3. The combination with a water filter tank, of a duct for supplying water to said tank, mechanism to shunt the water in said duct away from the filter tank, and automatic means operated by the water shunted away from the filter tank to divert the water in said duct to the tank after it has been shunted for a time.

4. In a water filter, the combination with a filter tank, of a duct for supplying water to said tank, a by-pass leading from said duct, a valve controlling both the passage of water through said by-pass and the passage of water through said duct to said tank, a suspended bucket adapted to receive water flowing through said by-pass and connected to said valve to operate the same to close said by-pass and divert the water to said filter tank, the said bucket having an outlet from which the water therein passes to waste.

5. In a water filter, the combination with a filter tank, of a duct for supplying water to said tank, a by-pass leading from said duct, a valve controlling both the passage of water through said by-pass and the passage of water through said duct to said tank, a suspended bucket adapted to receive water flowing through said by-pass and connected to said valve to operate the same in one direction to close said by-pass and divert the water to the filter tank, and means operated by the flow of water from said tank to operate said valve in another direction to open said by-pass and close the passage of the water to the tank.

6. In a water filter, the combination with a filter tank, of a duct for supplying water to said tank, a by-pass leading from said duct, a valve controlling both the passage of water through said by-pass and the passage of water through said duct to said tank, a suspended bucket adapted to receive water flowing through said by-pass, and connected to said valve to operate the same, an outlet for the water from said filter, a movable receptacle adapted to receive water from said outlet and operatively connected to said bucket and valve, the downward movement of said bucket due to the water therein operating said valve to close said by-pass and divert the water to the filter and operate said receptacle to cause the same to hold water from said outlet, and the downward movement of said receptacle due to the weight of the water therein raising said bucket and operating said valve to open said by-pass and close the passage of water to the filter tank.

7. In a water filter, the combination with two filter tanks having a passage for the water from one tank to the other, of a water supply duct leading to one of said tanks, a by-pass leading from said duct, a valve for controlling the said by-pass and the passage of water through said duct to said tank, a vertically movable bucket operatively connected to said valve and adapted to receive water through said by-pass and to be operated by the weight of said water to cause said valve to close said by-pass, the said bucket having an opening in its bottom and a valve controlling said opening and operating on the downward movement of said bucket to open said opening and permit said bucket to empty, valve controlled water outlets for said tanks, a movable receptacle adapted to receive water from said outlets, operative connection between said receptacle and said valve and between said receptacle and said bucket, whereby the falling of said bucket raises said receptacle and the falling of said receptacle raises said bucket to its normal position and operates said valve to open said by-pass and closes the passage of water to the filter.

In testimony whereof I affix my signature in presence of two witnesses.

WILLIE H. McMURTRY.

Witnesses:
J. E. SEALE,
C. B. SAUNDERS.

---

Copies of this patent may be obtained for five cents each, by addressing the "Commissioner of Patents, Washington, D. C."